United States Patent [19]
Kabe et al.

[11] Patent Number: 5,837,077
[45] Date of Patent: Nov. 17, 1998

[54] PNEUMATIC VEHICLE TIRE HAVING BELT WOUND FROM FLATTENED TUBULAR TAPE

[75] Inventors: Kazuyuki Kabe; Shuji Takahashi; Tomohiko Kogure, all of Hiratsuka, Japan

[73] Assignee: The Yokohama Rubber, Co., Ltd., Tokyo, Japan

[21] Appl. No.: 693,671

[22] Filed: Aug. 13, 1996

[30] Foreign Application Priority Data

Aug. 18, 1995 [JP] Japan ..................................... 7-210795
Oct. 24, 1995 [JP] Japan ..................................... 7-275648

[51] Int. Cl.$^6$ ........................................................ B60C 9/18
[52] U.S. Cl. ........................... 152/527; 152/528; 152/531; 152/533; 152/537; 156/117
[58] Field of Search ....................... 152/528, 533, 152/531, 532, 527, 526, 537, 538; 156/117

[56] References Cited

U.S. PATENT DOCUMENTS

| | | | |
|---|---|---|---|
| 1,144,079 | 6/1915 | Tew ......................................... | 152/527 |
| 2,895,525 | 7/1959 | Lugli ....................................... | 152/528 |
| 2,982,327 | 5/1961 | Vanzo et al. ............................. | 152/528 |
| 2,982,328 | 5/1961 | Emanueli et al. ....................... | 152/528 |
| 3,018,814 | 1/1962 | Saint-Paul ............................... | 152/528 |
| 3,550,667 | 12/1970 | Bartley et al. .......................... | 152/361 |
| 4,399,187 | 8/1983 | Holroyd et al. ......................... | 428/295 |
| 4,745,957 | 5/1988 | Sumner ................................... | 152/531 |
| 4,889,173 | 12/1989 | Mathews ................................. | 152/528 |
| 4,929,292 | 5/1990 | Holroyd et al. ......................... | 156/132 |
| 4,987,938 | 1/1991 | Ushikubo et al. ....................... | 152/528 |
| 5,039,372 | 8/1991 | Deal ........................................ | 156/397 |
| 5,223,060 | 6/1993 | Imamiya et al. ........................ | 152/527 |
| 5,223,061 | 6/1993 | Navaux .................................... | 152/533 |
| 5,308,432 | 5/1994 | Siegenthaler ............................ | 156/117 |
| 5,427,167 | 6/1995 | Watanabe et al. ...................... | 152/531 |
| 5,465,773 | 11/1995 | Kadota et al. .......................... | 152/454 |

FOREIGN PATENT DOCUMENTS 5-193306 A  8/1993  Japan .

*Primary Examiner*—Geoffrey L. Knable
*Attorney, Agent, or Firm*—Finnegan, Henderson, Farabow, Garrett & Dunner, L.L.P.

[57] ABSTRACT

A pneumatic vehicle tire having a belt layer at the outside of a carcass layer of the tread, wherein a plurality of mutually parallel reinforcement cords are wound back and forth in a spiral at a predetermined angle to the longitudinal direction and embedded in a matrix of a lateral flattened tubular cross-section to form a continuous tape and the continuous tape is continuously wound around the outer circumference of the carcass layer a plurality of times in a spiral to form the belt layer or a pneumatic vehicle tire having a continuous tape, composed of a two-layer construction consisting of a plurality of aligned rubberized reinforcement cords wound in a spiral to form a lateral flattened tubular cross-section and an elastic cord inserted inside the flattened tube along its longitudinal direction as a core member, continuously wound over an outer circumference of a carcass layer at a tread in a spiral with a slight angle with respect to the tire circumferential direction to form a belt layer.

11 Claims, 6 Drawing Sheets

PNEUMATIC VEHICLE TIRE HAVING BELT WOUND FROM FLATTENED TUBULAR TAPE

BACKGROUND OF THE INVENTION

1. Field of the Invention

The present invention relates to a pneumatic vehicle tire having improved high speed durability steering stability and riding comfort, while capable of being produced at a high productivity.

2. Description of the Related Art

In the past, the belt layer of a pneumatic radial tire was formed by joining together in the tire circumferential direction pieces of a rubberized sheet consisting of reinforcement cords embedded in rubber bias-cut to widths corresponding to the belt so as to give an angle of the cords to the tire circumferential direction of 10° to 40°. Accordingly, there were cut ends at the two sides of the belt layer in the width direction. When the tire was used, stress would concentrate at the cut ends and separation unavoidably would occur between the rubber and cords. Further, there was the problem that this separation appeared more noticeably the higher the vehicle speed, and therefore, the high speed durability was poor.

Further, as explained above, since a large number of steps were required for the manufacture of the tire, such as preparing the bias-cut sheets and connecting the sheets, the productivity was lowered.

FIG. 9 shows one example of a conventional pneumatic radial tire. In FIG. 9, the carcass layer 6 is arranged stretching from one bead portion to the other bead portion through the tread portion 3 and side portions 4. At the bead portions, the ends of the carcass layer 6 are folded back up from the inside of the tire to the outside around the bead cores 5. At the tread portion 3 on the outside of the carcass layer 6, a belt layer 7 is arranged in a ring in the tire circumferential direction EE' across the circumference of the tire 1.

SUMMARY OF THE INVENTION

Accordingly, the objects of the present invention are to eliminate the above-mentioned disadvantage of the conventional pneumatic tire and to provide a pneumatic vehicle tire having excellent high speed durability and further superior steering stability and riding comfort while capable of being produced at a high productivity.

Other objects and advantages of the present invention will be apparent from the following description.

In accordance with the first aspect of the present invention, there is provided a pneumatic vehicle tire having a belt layer at the outside of a carcass layer of a tread, wherein a plurality of mutually parallel reinforcement cords are wound back and forth in a spiral at a predetermined angle to the longitudinal direction and embedded in a matrix of a lateral flattened cylindrical cross-section to form a continuous tape and the continuous tape is continuously wound around the outer circumference of the carcass layer a plurality of times in a spiral to form the belt layer.

In accordance with the second aspect of the present invention, there is provided a pneumatic vehicle tire having a continuous tape, comprising a two-layer construction consisting of a plurality of aligned rubberized reinforcement cords wound in a spiral to form a lateral flattened tubular cross-section and an elastic cord or a short fiber reinforced rubber strip inserted inside the flattened tube along its longitudinal direction as a core member, continuously wound over an outer circumference of a carcass layer at a tread in a spiral with a slight angle with respect to the tire circumferential direction to form a belt layer.

In accordance with the second aspect of the present invention, there is also provided a pneumatic vehicle tire having a continuous tape, comprising a two-layer construction consisting of a plurality of aligned rubberized reinforcement cords wound in a spiral to form a lateral flattened tubular cross-section and a short fiber-reinforced rubber strip inserted inside the flattened tube along its longitudinal direction as a core member, continuously wound over an outer circumference of a carcass layer at a tread in a spiral with a slight angle with respect to the tire circumferential direction to form a belt layer.

BRIEF DESCRIPTION OF THE DRAWINGS

The present invention will be better understood from the description set forth below with reference to the accompanying drawings, wherein.

DESCRIPTION OF THE PREFERRED EMBODIMENT

According to the first aspect of the present invention, since the belt layer is formed by winding a continuous tape of a lateral flattened tubular cross-section on the outer circumference of the carcass layer in this way, there are no cut ends at the two sides of the belt layer in the width direction, and therefore, no separation occurs between the rubber and cords at the two sides. Further, when the beginning and end of the continuous tape are positioned other than at the two ends of the belt layer in the width direction, the rigidity at the two ends of the belt layer in the width direction rises, and therefore, no separation occurs between the belt layers at the two ends. Thus, the high speed durability becomes even better.

Further, since the reinforcement cords are continuous with no cut ends at the two sides of the belt layer in the width direction, the tire lateral rigidity becomes higher, and therefore, the steering stability can be improved. Also, since there are no splices of the belt layer which extends from one end to the other end in the width direction of the belt layer, there is no difference in rigidity in the belt layer in the tire circumferential direction. Thus, the tire uniformity is enhanced and the riding comfort is improved.

Further, even when the belt layer is comprised by steel cords, the rigidity at the two ends in the width direction rises compared with a conventional steel cord belt layer with cut ends, and therefore, the amount of the belt material (e.g., steel cords and rubber matrix) used can be reduced and the weight can be lightened. In the case of the steel cords, either the twisted cords or the single wire can be used. When the single wire are used, the diameter thereof is preferably 0.1 to 0.3 mm. When the twisted cords are used, the use of the structure of n×m, wherein n is 1 to 3 and m is 2 to 5 is preferable for the purpose of the preparation of the tapes in a spiral form.

On top of this, since a belt layer is formed by the simple procedure of wrapping a continuous tape of a lateral flattened tubular cross-section around the outer circumference of the carcass layer, the tire productivity can be advantageously increased.

Figure 8:
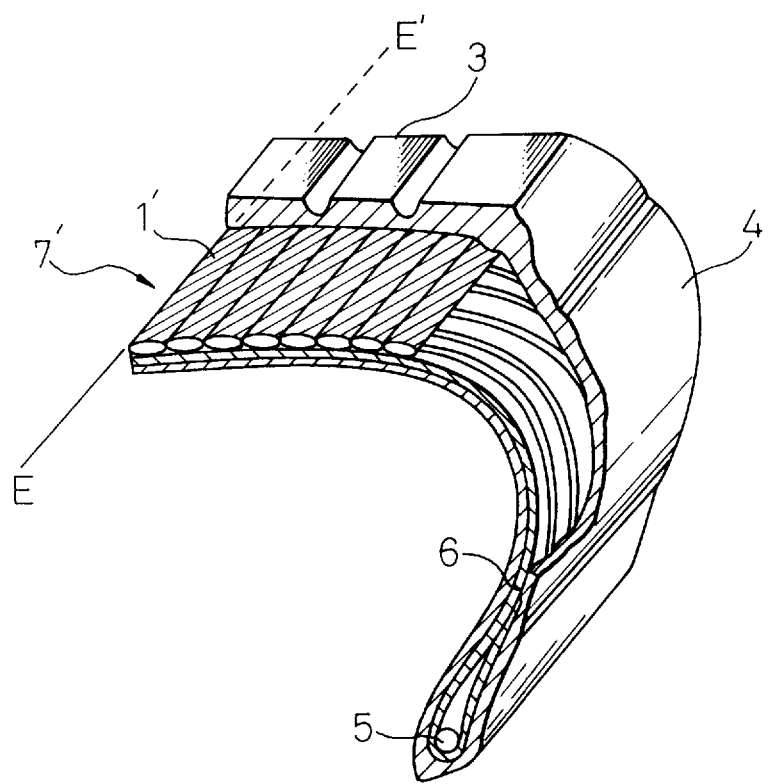
FIG. 8 is a partially cutaway perspective view of an example of a pneumatic radial tire having a belt layer in the present invention.

FIG. 8 shows an example of a pneumatic radial tire of the present invention. In FIG. 8, in the same way as in FIG. 9, the ends of the carcass layer 6 are folded back up from the inside to the outside of the tire about the left and right pair of bead cores 5 and the belt layer 7 is arranged in a ring in the tire circumferential direction EE' across the circumference of the tire 1' at the outside of the carcass layer 6 in the tread portion 3.

Figure 1:
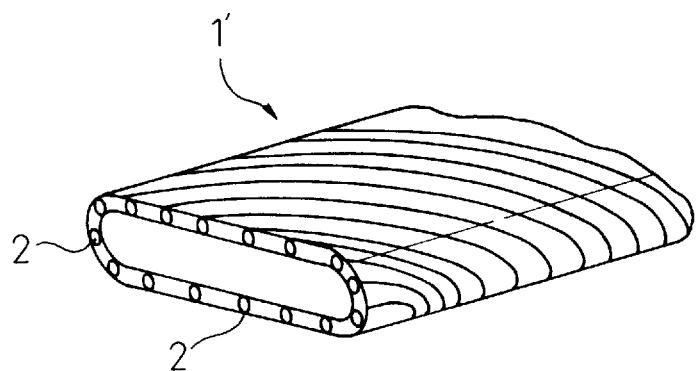
FIG. 1 is a perspective explanatory view of a continuous tape forming the belt layer in the present invention.

According to the present invention, the belt layer 7' is formed by winding the continuous tape 1' with the lateral flattened cross-section shown in FIG. 1, that is, the lateral flattened tubular cross-section, continuously in a spiral several times at the outside of the carcass layer in the tire circumferential direction across a width corresponding to the width of the belt layer 7'. This continuous tape 1' may be formed by taking a sheet comprised of a plurality of reinforcement cords 2 (organic fiber cords or steel cords), preferably 5 to 100 cords, embedded in parallel in a matrix and winding it back and forth continuously in a spiral to form a tubular member, then flattening the tubular member in the longitudinal direction. Further, it is possible to form the continuous tape 1' by using a tuber (extruding machine) able to form a tubular matrix sheet and a die capable of having a predetermined number of reinforcement cords inserted therein so as to extrude the reinforcement cords embedded in the tubular matrix sheet, turning the die to arrange the reinforcement cords in a spiral, then using a roller etc. to flatten the assembly.

The width of the continuous tape 1' is 5 mm to 60 mm. When the width is less than 5 mm, the width is too small and the productivity of the tubular member falls, while when the width is more than 60 mm, the width of the end of the continuous tape 1' becomes too great, and therefore, the tire uniformity and durability deteriorate. The cord angle of the reinforcement cords 2 with respect to the longitudinal direction of the continuous tape 1' should be 10° to 45°, more preferably 15° to 35°.

The reinforcement cords are twisted cords comprised of twist assemblies of one or more types of organic fibers selected from the group comprising aromatic polyamide fiber, polyarylate fiber, poly-p-phenylene benzbisoxazole fiber, polyvinyl alcohol fiber, rayon fiber, polyethylene terephthalate fiber, polyethylene2,6-naphthalate fiber, and nylon fiber. Further, the matrix is not limited to rubber and may be a urethane elastomer or a thermoplastic elastomer.

It is possible to insert a core member composed of a rubber sheet inside the continuous tape 1' in the longitudinal direction of the same.

Figure 2:
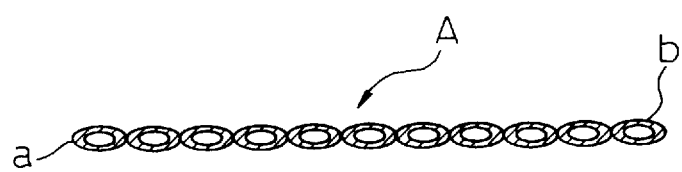
FIG. 2 is a lateral cross-sectional explanatory view of an example of the belt layer in the present invention.

When forming the belt layer by continuously winding the continuous tape 1' several times in a spiral over the outer circumference of the carcass layer across a width corresponding to the width of the belt layer, it is possible to wind the continuous tape 1' with a beginning a at one end of the belt layer A in the width direction and an end b at the other end in the width direction as shown in FIG. 2 so as to form a single-layer belt layer as a whole. Further, to further raise the durability and rigidity of the belt layer, as shown in FIG. 3 to FIG. 7, it is possible to position the beginning a and end b of the continuous tape 1' other than at the two ends of the belt layer A in the width direction so as to further enhance the effect of the present invention.

Figure 3:
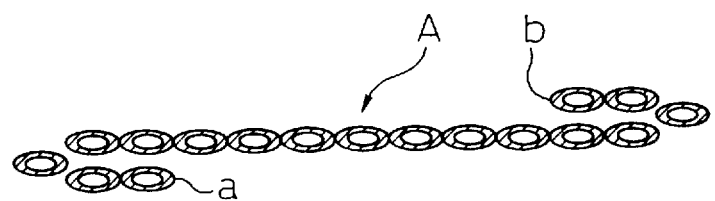
FIG. 3 is a lateral cross-sectional explanatory view of an example of the belt layer in the present invention.

In FIG. 3, the continuous tape 1' is wound with a beginning a at one end of the belt layer A in the width direction and an end b at the other end in the width direction to form a superposed construction of two layers at the two ends and one layer at the center.

Figure 4:
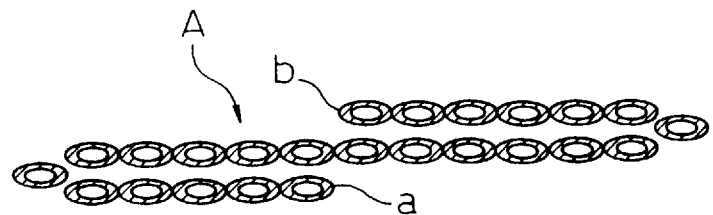
FIG. 4 is a lateral cross-sectional explanatory view of an example of the belt layer in the present invention.
Figure 5:
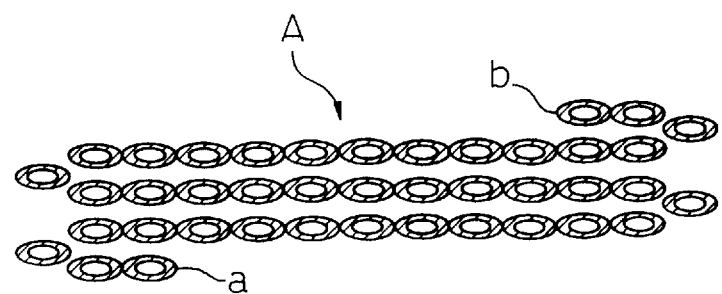
FIG. 5 is a lateral cross-sectional explanatory view of an example of the belt layer in the present invention.

In FIG. 4, the continuous tape 1' is wound with a beginning a at the center of the belt layer A and an end b at the center to form a superposed construction of two layers across the entire width of the belt layer. In FIG. 5, the continuous tape 1' is wound with a beginning a at one end of the belt layer A in the width direction and an end b at the other end in the width direction to form a superposed construction of four layers at the two ends and three layers at the center.

Figure 6:
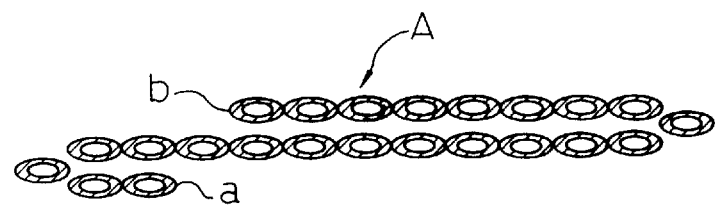
FIG. 6 is a lateral cross-sectional explanatory view of an example of the belt layer in the present invention.

In FIG. 6, the continuous tape 1' is wound with a beginning a at one end of the belt layer A in the width direction and an end b at the center to form a superposed construction of two layers at one end and two layers from the other end to the center.

Figure 7:
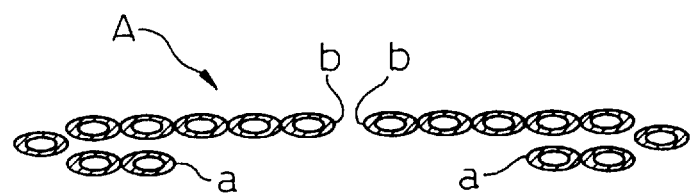
FIG. 7 is a lateral cross-sectional explanatory view of an example of the belt layer in the present invention.

In FIG. 7, the continuous tape 1' is wound with a beginning a at the two ends of the belt layer A and an end b at the center to form a superposed construction of two layers at the two ends and one layer at the center.

When winding the continuous tape 1' in this way, it is possible to bring the adjoining sides of the continuous tape 1' into abutment, superpose them slightly (about −5 mm) to give a step difference, or leave a slight space between them (about +5 mm).

According to the second aspect of the present invention, since the belt layer is formed by winding a continuous tape of a lateral flattened tubular cross-section and two-layer superposed structure on the outer circumference of the carcass layer in this way, there are no cut ends at the two sides of the belt layer in the width direction, and therefore no separation occurs between the rubber and cords at the two sides. Further, since core members are inserted between layers and the cords of the two layers cross each other in the continuous tape, the rigidity of the belt layer can be increased. Thus, the high speed durability becomes excellent.

Further, since the reinforcement cords are continuous with no cut ends at the two sides of the belt layer in the width direction, the tire lateral rigidity becomes higher, and therefore the steering stability is improved. Also, since there are no splices of the belt layer which extends from one end to the other end in the width direction of the belt layer, there is no difference in rigidity in the belt layer in the tire circumferential direction. Thus, the tire uniformity is enhanced and the riding comfort is improved.

Further, even when the belt layer is comprised by steel cords, the rigidity at the two ends in the width direction rises compared with a conventional steel cord belt layer with cut ends, so the amount of the belt material (e.g., steel cords and cord rubber) used can be reduced and the weight can be lightened.

On top of this, since a belt layer is formed by the simple procedure of wrapping a continuous tape of a lateral flattened tubular cross-section around the outer circumference of the carcass layer, the tire productivity can be increased.

Figure 9:
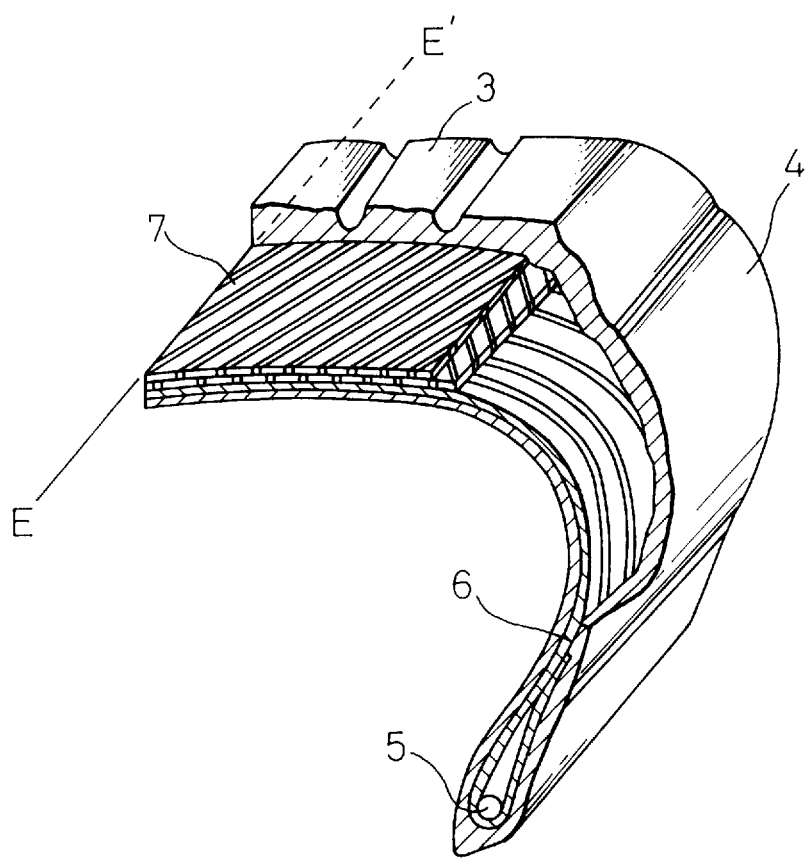
FIG. 9 is a lateral cross-sectional explanatory view of an example of a pneumatic radial tire having a belt layer in the prior art.

As mentioned above, an example of a conventional pneumatic tire is shown in FIG. 9.

Figure 10:
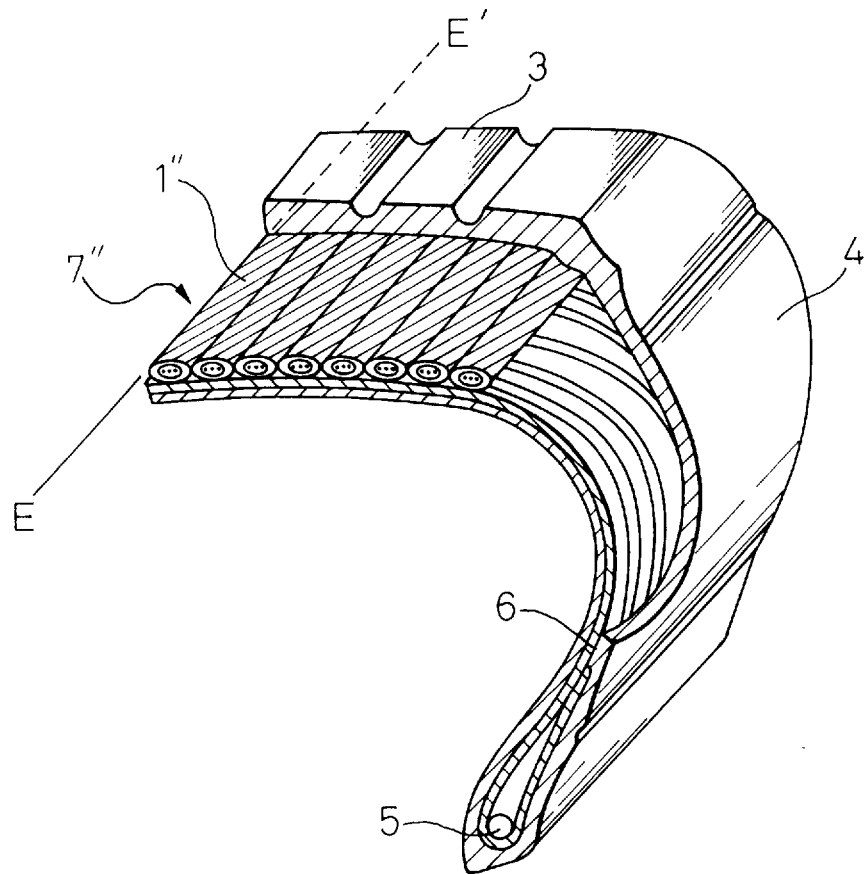
FIG. 10 is a partially cutaway perspective view of an example of a pneumatic tire having a belt layer in the present invention.

FIG. 10 shows an example of a pneumatic radial tire according to the second aspect of the present invention. In FIG. 10, in the same way as in FIG. 9, the ends of the carcass layer 6 are folded back up from the inside to the outside of the tire about the left and right pair of bead cores 5 and the belt layer 7" is arranged in a ring in the tire circumferential direction EE' across the circumference of the tire 1" at the outside of the carcass layer 6 in the tread portion 3.

Figure 11:
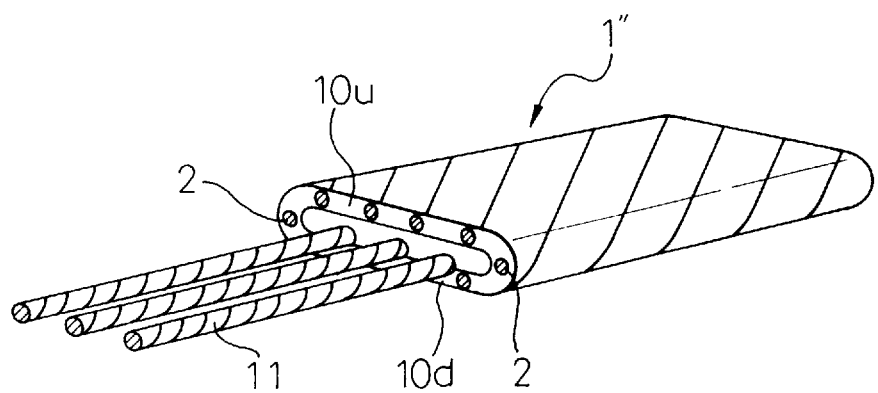
FIG. 11 is a perspective explanatory view of an example of a continuous tape forming the belt layer in the present invention.

The belt layer 7" is formed by winding the continuous tape 1" with the lateral flattened tubular cross-section shown in FIG. 11 continuously in a spiral several times at the outside of the carcass layer in the tire circumferential direction EE' across a width corresponding to the width of the belt layer. This continuous tape 1" is comprised of a plurality of reinforcement cords 2 arranged in a tubular shape and covered with rubber to form a two-layer superposed structure of a top layer 10u and a bottom layer 10d and a core member 11 inserted between these layers, with the reinforcement cords 2 of the two layers crossing each other.

This continuous tape 1" may be formed by arranging a plurality of reinforcement cords 2 (e.g., organic fiber cords or steel cords), preferably 5 to 100 cords, in a tubular shape (for example, using an extrusion machine able to form them into a tubular shape), then twisting the tubular bundle of cords by a predetermined angle with respect to the longitudinal direction and embedding the same in rubber to cover it with rubber and thereby form a rubberized tubular member, inserting the core member 11 into the tubular member, then flattening the tubular member along its longitudinal direction.

The organic fiber cords constituting the reinforcement cords 2 are twisted cords comprised of twist assemblies of one or more types of organic fibers selected from the group comprising aromatic polyamide fiber, polyarylate fiber, poly-p-phenylene benzbisoxazole fiber, polyvinyl alcohol fiber, rayon fiber, polyethylene terephthalate fiber, polyethylene-2,6-naphthalate fiber, and nylon fiber, as previously mentioned.

The cord angle of the reinforcement cords 2 with respect to the longitudinal direction of the continuous tape 1" should be 10° to 45° preferably 15° to 30°. This is because when forming the belt layer 7 by the continuous tape 1", the longitudinal direction of the continuous tape 1" becomes substantially the tire circumferential direction EE', so the cord angle of the reinforcement cords 2 is, like the cord angle of the usual belt layer, made 10° to 45° with respect to the tire circumferential direction EE'.

As the core member 11, an elastic cord with a cord angle of substantially 0° with respect to the longitudinal direction of the continuous tape 1" may be used. The cord angle is made substantially 0° because the longitudinal direction of the continuous tape 1", as explained above, becomes substantially the tire circumferential direction EE', and therefore, this enhances the rigidity of the belt layer 7 in the circumferential direction of the tire and further improves the high speed durability and steering stability. Further, an elastic cord may be used so as to facilitate the expansion of the tire in the radial direction when lift is applied at the time of tire manufacture.

Figure 12:
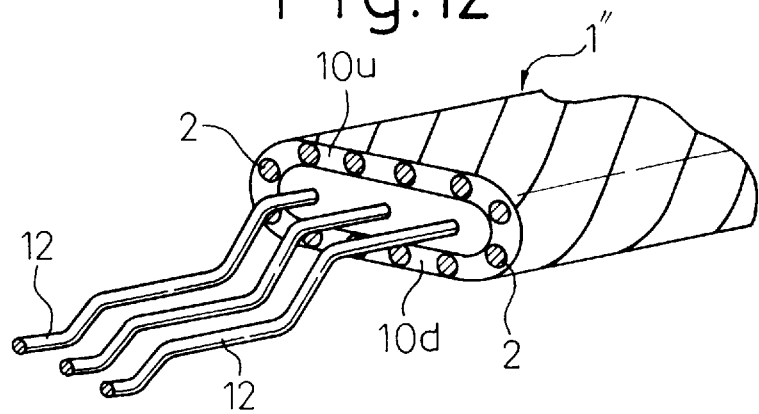
FIG. 12 is a perspective explanatory view of another example of a continuous tape forming the belt layer in the present invention.

As the elastic cord, either an organic fiber cord or a metal cord may be used. In this case, the elastic characteristic may be set in accordance with the lift rate of the belt layer 7. Further, the material of the cord, the number of ends, the cord diameter, etc. may be suitably decided on in accordance with the required high speed properties. Further, the elastic cord may be covered in advance by rubber and the core member and reinforcement cord layer made integral. As the metal cord, use may be made of a wavy metal cord 12 given flat waves in its longitudinal direction as shown in FIG. 12 or a metal cord wound in a coil in its longitudinal direction may be used. This is because they are easily stretched in the longitudinal direction.

Figure 13:
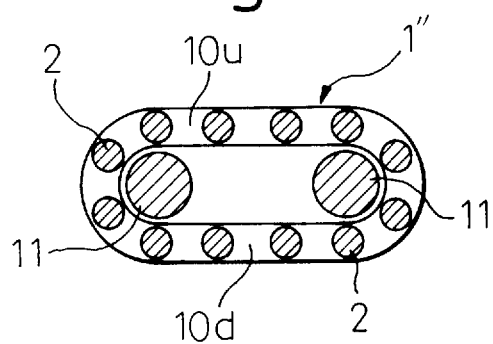
FIG. 13 is a lateral cross-sectional view of an example of the belt layer in the present invention.

Further, when using an elastic cord as the core member 11, as shown in FIG. 13, one cord each may be provided at the two ends of the width direction of the flat inside of the continuous tape 1". This enables the flat shape of the continuous tape 1" to be further stabilized and therefore the rigidity of the belt layer 7 formed to be made uniform in distribution.

Figure 14:
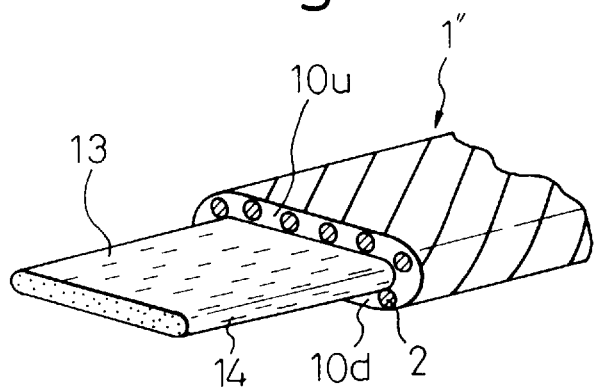
FIG. 14 is a perspective explanatory view of still another example of a continuous tape forming the belt layer in the present invention.

As the core member 11, further, as shown in FIG. 14, use may be made of a short fiber-reinforced rubber strip 14. This short fiber-reinforced rubber strip 14 is formed by mixing short fibers 13 in matrix rubber in a manner oriented in the longitudinal direction of the continuous tape 1". The type of the short fiber 13 in this case, the content of the rubber, etc. may be suitably selected. The short fiber 13 is of a length of 5 $\mu$m to 5 mm, more preferably 50 $\mu$m to 3 mm.

The width of the continuous tape 1 is 5 mm to 60 mm. When the width is less than 5 mm, the width is too small and the productivity of the tubular member falls, while when the width is more than 60 mm, the width of the end of the continuous tape 1" becomes too great, and therefore, the tire uniformity and durability deteriorate.

When forming the belt layer 7 by continuously winding the continuous tape 1" several times in a spiral at a slight angle with respect to the circumferential direction of the tire over the outer circumference of the carcass layer 6 across a width corresponding to the width of the belt layer, it is possible to wind the continuous tape 1" with a beginning a at one end of the belt layer A in the width direction and an end b at the other end in the width direction as shown in FIG. 2 above so as to form a single-layer belt layer as a whole. Further, to further raise the durability and rigidity of the belt layer, as shown in FIG. 3 to FIG. 7, it is possible to position the beginning a and end b of the continuous tape 1" other than at the two ends of the belt layer A in the width direction so as to further enhance the effect of the present invention. That is, when the beginning a and end b of the continuous tape 1 are positioned other than at the two ends of the belt layer A in the width direction, the rigidity at the two ends of the belt layer A in the width direction rises, and therefore, no separation occurs between the belt layers at the two ends. Thus, the high speed durability becomes even better.

As explained previously, with reference to FIGS. 2 to 7, when winding the continuous tape 1" in this way, it is possible to bring the adjoining sides of the continuous tape 1" into abutment, superpose them slightly (about −5 mm) to give a step difference, or leave a slight space between them (about +5 mm).

EXAMPLES

The present invention will now be further illustrated by, but is by no means limited to, the following Examples.

Example 1

The high speed durability and the steering stability were evaluated for the Present Tires 1 and 2 and the Comparative Tire 1 of the following belt constructions under the following conditions as explained below. The results are shown in Table 1.

Present Tire 1

Belt layer reinforcement cords: Kevlar® (aromatic polyamide fiber cords) 1500 d/2. Number of ends: 51/5 cm. Continuous tape of width of 15 mm and cord angle of 25° wound in spiral to form single layer belt (FIG. 2).

Present Tire 2

Belt layer reinforcement cords: Kevlar® (aromatic polyamide fiber cords) 1500 d/2. Number of ends: 51/5 cm. Continuous tape of width of 15 mm and cord angle of 25° wound in spiral to form belt of two layers at two ends of belt and one layer at center (FIG. 3).

Comparative Tire 1

Belt layer reinforcement cords: Kevlar® (aromatic polyamide fiber cords) 1500 d/2. Number of ends: 51/5 cm.

Two belt layers with cord angle, that is, angle of cords of different plies crossing each other, of 25° (step-type 2-ply structure). Cut ends at two sides of belt layers in width direction.

Conditions

Air pressure: 200 KPa, rim: 14×51/2JJ, load: 4.9 KN

Tire size: 195/60 R14

Tire structure, dimensions, etc. other than of belt layer identical

High Speed Durability

After a JATMA test of high speed durability on a drum of a diameter of 1707 mm, the test was continued with an acceleration of 10 km/hr until the tire broke. The results are shown indexed to the Comparative Tire 1 as 100. The larger the value, the better.

Steering Stability

A test was conducted on the feel of the steering stability in an actual car. In this case, the tire was attached to a Japanese 2.5-liter class car and the car moved six times in the width direction. The feeling of the steering was evaluated by test panelists. The results are shown indexed to that of Comparative Tire 1 as 100. The larger the value, the better.

TABLE 1

|  | Present Tire 1 | Present Tire 2 | Comparative Tire 1 |
|---|---|---|---|
| High speed durability | 135 | 150 | 100 |
| Steering stability | 120 | 125 | 100 |

As clear from Table 1, the Present Tires 1 and 2 are superior in each of the high speed durability and steering stability.

As explained above, according to the first embodiment of the present invention, there is provided a pneumatic radial tire having a belt layer at the outside of the carcass layer in the tread, wherein a plurality of mutually parallel reinforcement cords are wound back and forth in a spiral at a predetermined angle to the longitudinal direction and embedded in a matrix of a lateral flattened tubular cross-section to form a continuous tape and the continuous tape is wound around the outer circumference of the carcass layer continuously a plurality of times in a spiral to form the belt layer. Accordingly, it is possible to provide a pneumatic radial tire which is excellent in high speed durability and further superior in steering stability and riding comfort. Further, according to the present invention, there are no cut ends at the two sides of the belt layer in the width direction, so the belt rigidity (tension and in-plane) is improved and accordingly low modulus organic fibers may be used for the reinforcement cords of the belt layer. Further, the continuous tape is wound around the outer circumference of the carcass layer to form the belt layer, and therefore, there is no need for the sheet cutting step etc. for forming the belt layer as in the prior art and, in addition, the tubular member with the embedded reinforcement cords is extruded by a tuber and the tubular member is wound to form the belt layer on the shaping drum. Thus, it is possible to shape the tire continuously.

Example 2

The high speed durability and the steering according to the second aspect of the present invention stability were evaluated for Present Tire 3, Comparative Tire 2, and Conventional Tire 1 of the following belt constructions as explained below. The results are shown in Table 2.

Present Tire 3

Reinforcement cords: Kevlar® (aromatic polyamide fiber cords) 1500 d/2, number of ends: 51/5 cm, reinforcement cord angle: 20°. Core member: three Nylon 66 840 D/2 cord per tape. This continuous tape (width 15 mm) was wound in a spiral to form a single layer belt layer (FIG. 1).

Comparative Tire 2

Same as Present Tire 1 except that no core member provided.

Conventional Tire 1

Belt structure shown in FIG. 9. Belt layer reinforcement cords: Kevlar® (aromatic polyamide fiber cords) 1500 d/2. Number of ends: 51/5 cm. Cord angle: 20°.

High Speed Durability

The tire was attached to a vehicle under conditions of a tire size 195/60 R15, a load of 4.6 kN, an inner pressure of 300 kPa, and a rim of 15×6-JJ, run at 120 minutes×80 km/h as a first step and 30 minutes×120 km/h as a second step, then run increasing the speed by 10 km/h every 30 minutes until breaking. The distance run until breaking was measured and indexed against that of the Conventional Tire 1 as 100. The larger the value, the better.

Steering Stability

The tire was attached to a vehicle under conditions of a tire size 195/60 R15, an inner pressure of 200 kPa, and a rim of 15×6-JJ and the vehicle was driven over a slalom test course with pylons provided every 30 m. The average speed was indexed against that of Conventional Tire 1 as 100. The larger the value, the better.

TABLE 2

|  | Conventional Tire 1 | Comparative Tire 2 | Present Tire 3 |
|---|---|---|---|
| High speed durability | 100 | 133 | 140 |
| Steering stability | 100 | 118 | 122 |

As clear from Table 2, the Present Tire 3 is superior in each of the high speed durability and steering stability.

As explained above, according to the second aspect of the present invention, a continuous tape, composed of a two-layer construction consisting of a plurality of aligned rubberized reinforcement cords wound in a spiral to form a lateral flattened tubular cross-section and an elastic cord or a short fiber-reinforced rubber strip inserted inside the flattened tube along its longitudinal direction as a core member, is continuously wound over an outer circumference of a carcass layer at a tread in a spiral with a slight angle with respect to the tire circumferential direction to form a belt layer, and therefore, it is possible to provide a pneumatic tire which is excellent in high speed durability and further superior in steering stability and riding comfort. Further, according to the present invention, the continuous tape is wound around the outer circumference of the carcass layer to form the belt layer, and therefore, there is no need for the sheet cutting step etc. for forming the belt layer as in the prior art. Thus, the tire productivity can be enhanced.

We claim:

1. In a pneumatic tire having a carcass layer, a tread portion and a belt layer annularly arranged around an outer circumferential surface of the carcass layer in the tread portion of the tire, the improvement wherein said belt layer comprises a tubular member that has been flattened in a longitudinal direction to form a continuous tape having a laterally flattened tubular cross-section, said continuous tape including a core member comprising a rubber sheet that has been inserted inside the laterally flattened tubular cross-section of the tape along the longitudinal direction thereof and being annularly wound continuously around the outer circumferential surface of the carcass layer a plurality of times in a spiral to form a substantially continuous belt layer in the width direction, wherein said tubular member comprises a plurality of mutually parallel reinforcement cords that have been embedded in a matrix and wound back and forth in a spiral at an angle of 10° to 45° with respect to the longitudinal direction of the continuous tape to form the tubular member.

2. The pneumatic vehicle tire of claim 1, wherein the reinforcement cords are twisted cords comprising twisted assemblies of at least one organic fiber selected from the group consisting of aromatic polyamide fiber, polyarylate fiber, poly-p-phenylene benzbisoxazole fiber, polyvinyl alcohol fiber, rayon fiber, polyethylene terephthalate fiber, polyethylene-2,6-naphthalate fiber, and nylon fiber.

3. The pneumatic vehicle tire of claim 1, wherein the reinforcement cords are steel cords.

4. The pneumatic vehicle tire of claim 1, wherein the matrix is at least one material selected from the group consisting of a rubber and a thermoplastic elastomer.

5. The pneumatic vehicle tire of claim 1, wherein the continuous tape has a width of from 5 to 60 mm.

6. The pneumatic tire of claim 1, wherein the belt layer has circumferentially extending longitudinal sides and a beginning and an end of the continuous tape is positioned in the belt layer other than at a longitudinal side thereof.

7. The pneumatic tire of claim 1, wherein the rubber sheet is a short-fiber reinforced rubber sheet.

8. In a pneumatic tire having a carcass layer, a tread portion and a belt layer annularly arranged around the outer circumferential surface of the carcass layer in the tread portion of the tire, the improvement wherein said belt layer comprises two tubular members that have been flattened in a longitudinal direction to form two continuous tapes having a laterally flattened tubular cross-section, each of said two continuous tapes including a core member comprising a rubber sheet that has been inserted inside the laterally flattened tubular cross-section of the tape along the longitudinal direction thereof and said two continuous tapes being annularly wound continuously around the outer circumferential surface of the carcass layer a plurality of times in a spiral to form a substantially continuous belt layer in the width direction, wherein each tubular member comprises a plurality of mutually parallel reinforcement cords that have been embedded in a matrix and wound back and forth in a spiral at a predetermined angle to form the tubular member.

9. The pneumatic tire of claim 8, wherein the reinforcement cords are wound at an angle of 10° to 45° with respect to the longitudinal direction of the continuous tape to form the tubular member.

10. The pneumatic tire of claim 8, wherein the belt layer has circumferentially extending longitudinal sides and a beginning and an end of each of the two continuous tapes is positioned in the belt layer other than at a longitudinal side thereof.

11. The pneumatic tire of claim 1, wherein the rubber sheet is a short-fiber reinforced rubber sheet.

* * * * *